United States Patent
Juranovich et al.

(10) Patent No.: US 7,768,385 B1
(45) Date of Patent: Aug. 3, 2010

(54) VEHICLE BRAKE LIGHTING SYSTEM

(76) Inventors: John M. Juranovich, 14209 W. 77Th Ave., Dyer, IN (US) 46311; Katherine A. Juranovich, 14209 W. 77Th Ave., Dyer, IN (US) 46311

( * ) Notice: Subject to any disclaimer, the term of this patent is extended or adjusted under 35 U.S.C. 154(b) by 379 days.

(21) Appl. No.: 11/818,746

(22) Filed: Jun. 15, 2007

(51) Int. Cl.
*B60Q 1/44* (2006.01)
*B60Q 1/52* (2006.01)
*B60Q 1/26* (2006.01)
*H04Q 5/22* (2006.01)

(52) U.S. Cl. .................. 340/479; 340/471; 340/468; 340/10.1; 340/467; 340/457.4

(58) Field of Classification Search .................. None
See application file for complete search history.

(56) References Cited

U.S. PATENT DOCUMENTS

| | | | |
|---|---|---|---|
| 4,806,782 A * | 2/1989 | Bernal ..................... 307/10.1 |
| D334,820 S | 4/1993 | Lee |
| 5,461,362 A * | 10/1995 | Echt ......................... 340/467 |
| 5,504,472 A | 4/1996 | Wilson |
| 5,606,310 A | 2/1997 | Egger et al. |
| 6,351,211 B1 * | 2/2002 | Bussard ..................... 340/468 |
| 6,744,359 B1 | 6/2004 | Wasilewski et al. |
| 6,744,361 B1 * | 6/2004 | Maddox ..................... 340/479 |
| 6,753,769 B1 | 6/2004 | Elliott |
| 6,765,483 B1 * | 7/2004 | Naqvi ........................ 340/479 |
| 7,190,260 B2 * | 3/2007 | Rast ........................... 340/479 |
| 7,330,106 B2 * | 2/2008 | Paulson et al. ............. 340/467 |
| 2003/0122663 A1 * | 7/2003 | Carlson et al. ............. 340/467 |
| 2004/0189458 A1 | 9/2004 | Boyer et al. |
| 2006/0273891 A1 * | 12/2006 | Quach et al. ............... 340/467 |
| 2008/0258899 A1 * | 10/2008 | Stiles et al. ................ 340/471 |

* cited by examiner

*Primary Examiner*—Daniel Wu
*Assistant Examiner*—Fekadeselassie Girma

(57) ABSTRACT

A system includes lights coupled to a vehicle power supply source. One light is located at the vehicle's rear window. Remaining lights are independently and simultaneously operable with the one light. A mechanism is included for determining whether the vehicle is parked. Another mechanism determines whether a vehicle brake pedal has been engaged beyond a threshold level while the vehicle is not parked. A further mechanism flashes the one light and is mated to the park determining mechanism for activating the one light when the vehicle is parked and the brake pedal is engaged. The flashing mechanism is coupled to the brake pedal pressure level determining mechanism for activating the one light when the vehicle is not parked and the brake pedal is engaged beyond the threshold level. The flashing mechanism is automatically reset to a non-operating mode when the brake pedal is disengaged during parked and non-parked conditions.

7 Claims, 4 Drawing Sheets

VEHICLE BRAKE LIGHTING SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to brake lighting systems and, more particularly, to a vehicle brake lighting system for informing a trailing vehicle of a sudden braking action initiated by a leading vehicle.

2. Prior Art

Currently, the only warning given of a change in speed of a vehicle to a following driver is the illumination of brake lights when the brake pedal is depressed. While it is highly recommended that vehicles follow at a safe distance, a panic stop of a preceding vehicle frequently results in rear end collisions. This is particularly true when the preceding vehicle is a large one such and a semi-tractor trailer unit or a large van which completely blocks the view of a following driver with respect to the traffic in front of the preceding vehicle.

Further, following at a presumed safe distance on a busy expressway can result in a greater likelihood of an accident than if one were to maintain a closer spacing. This is because aggressive drivers frequently use what one driver considers a safe interval, to be an interval large enough for the aggressive driver to move into when passing the following vehicle. Thus, due to the limited amount of space between the vehicles, upon sudden braking, the driver of the trailing vehicle actually has less time to react.

A study has shown that 80% of the rear end accidents could be prevented with just one more second to react. While looking ahead to the flow of traffic could help, drivers are often distracted by other things. Further, when following a large vehicle such as a truck or semi-tractor trailer, it is usually not possible to observe the traffic ahead of the truck or semi-tractor trailer.

Accordingly, a need remains for a vehicle brake lighting system in order to overcome the above-noted shortcomings. The present invention satisfies such a need by providing a brake lighting system that is automatically activated, convenient to use, and increases the safety of those on the road. Such a system flashes a third rear brake light in a panic deceleration or complete stop, thus allowing a following motorist to better judge how to react and avert a rear-end collision. This system is particularly helpful at alerting distracted, drowsy or daydreaming drivers that tend to be slow to react. Since the system operates automatically while the vehicle is operational, there is no extra effort required to warn a following traveler of a sudden slowdown or complete stop.

BRIEF SUMMARY OF THE INVENTION

In view of the foregoing background, it is therefore an object of the present invention to provide a vehicle brake lighting system. These and other objects, features, and advantages of the invention are provided by a vehicle brake lighting system for advantageously informing a trailing vehicle of a sudden braking action initiated by a leading vehicle.

The vehicle brake lighting system includes a plurality of light-emitting sources electrically coupled to an existing power supply source of the leading vehicle. One of the light-emitting sources is located at a rear window of the leading vehicle. Remaining ones of the light-emitting sources are independently and simultaneously operable with the one light-emitting source.

A mechanism is included for determining whether the leading vehicle is parked. Such a park determining mechanism preferably includes a magnetic motion sensor mounted to a drive axle of the leading vehicle. The motion sensor effectively generates and transmits a parking input signal to the flashing mechanism when the leading vehicle is toggled to a parked position.

A mechanism is included for conveniently and effectively determining whether a brake pedal of the leading vehicle has been engaged beyond a predetermined threshold pressure level while the leading vehicle is not parked. Such a brake pedal pressure level determining mechanism preferably includes a mercury switch directly coupled to the brake pedal of the leading vehicle. The mercury switch monitors the brake pedal pressure level during non-parked operating modes. Such a mercury switch includes a mercury filled tube including electrodes at opposed ends thereof. The mercury flows between the opposed ends of the tube when the brake pedal is tilted between engaged and non-engaged position wherein a braking input signal is conveniently generated as the mercury slides to the opposed end portions of the tube.

A mechanism is included for selectively flashing the one light-emitting source when the vehicle is not parked. Such a flashing mechanism is electrically mated to the park determining mechanism for advantageously indefinitely activating the one light-emitting source when the leading vehicle is parked and the brake pedal is engaged. The flashing mechanism is electrically coupled to the brake pedal pressure level determining mechanism for selectively activating the one light-emitting source for a predetermined time interval when the leading vehicle is not parked and when the brake pedal has been engaged beyond the predetermined threshold pressure level. Such a flashing mechanism is conveniently automatically reset to a non-operating mode when the brake pedal is disengaged during parked and non-parked operating conditions.

The flashing mechanism preferably includes an auxiliary exciter wire electrically coupled to the brake pedal, and a pulsating flasher circuit. A first switch is electrically coupled to the motion sensor and a power supply source and the auxiliary exciter wire respectively. Such a first switch has first and second isolated conductive ports. Such a second port is electrically coupled directly to the pulsating flasher circuit. The second switch has first and second isolated conductive ports wherein the first port is electrically coupled directly to the one light emitting source. Such a second port is electrically coupled to the pulsating flasher circuit. Such a first port of the first switch is electrically coupled directly to the second switch. A time counting circuit is electrically mated to the pulsating flasher circuit and the one light emitting source and the second switch respectively.

Such a pulsating flasher circuit preferably includes a processor and a memory includes software instructions for causing the system to flash the one light-emitting source. The software instructions performs the steps of sequentially interrupting the power supply for an indefinite time interval after the parking input signal has been received from the motion sensor and sequentially interrupting the power supply for a predetermined time interval after the parking input signal has been received from the motion sensor and the braking input signal has been received from the brake pedal pressure level determining mechanism.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
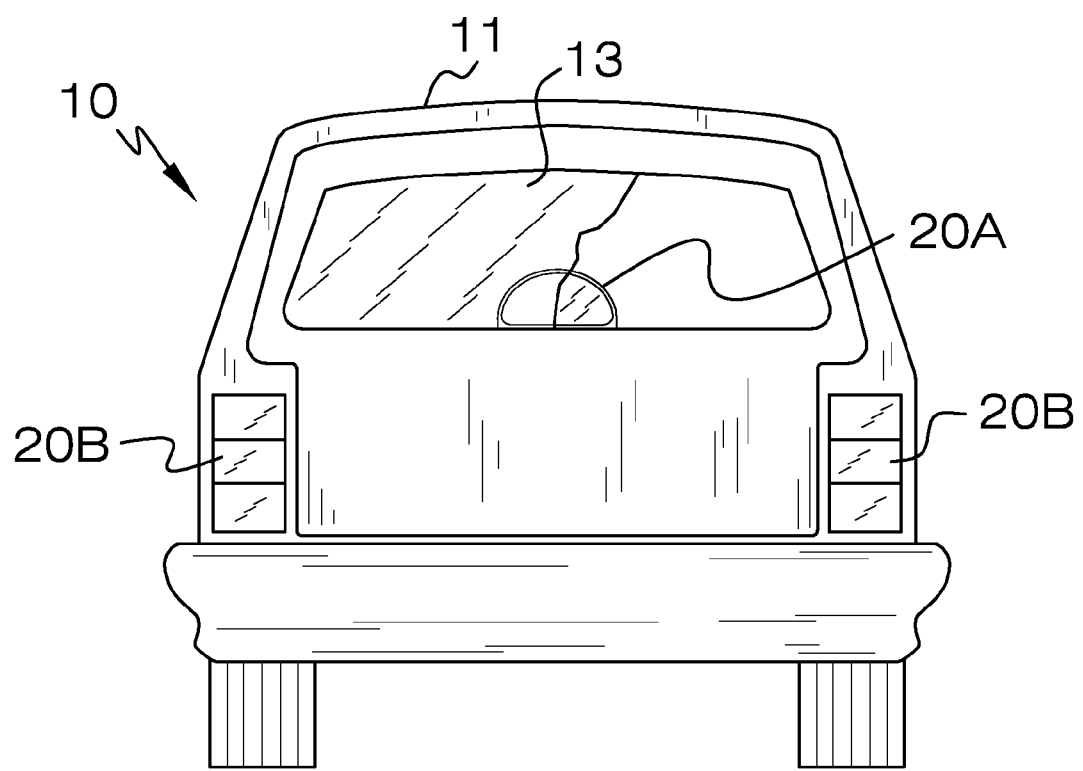
FIG. 1 is a front elevational view showing a vehicle brake lighting system, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The system of this invention is referred to generally in FIGS. 1-5 by the reference numeral 10 and is intended to provide a vehicle brake lighting system. It should be understood that the system 10 may be used to indicate sudden braking on many different types of vehicles and should not be limited in use to only small passenger vehicles.

Figure 3:
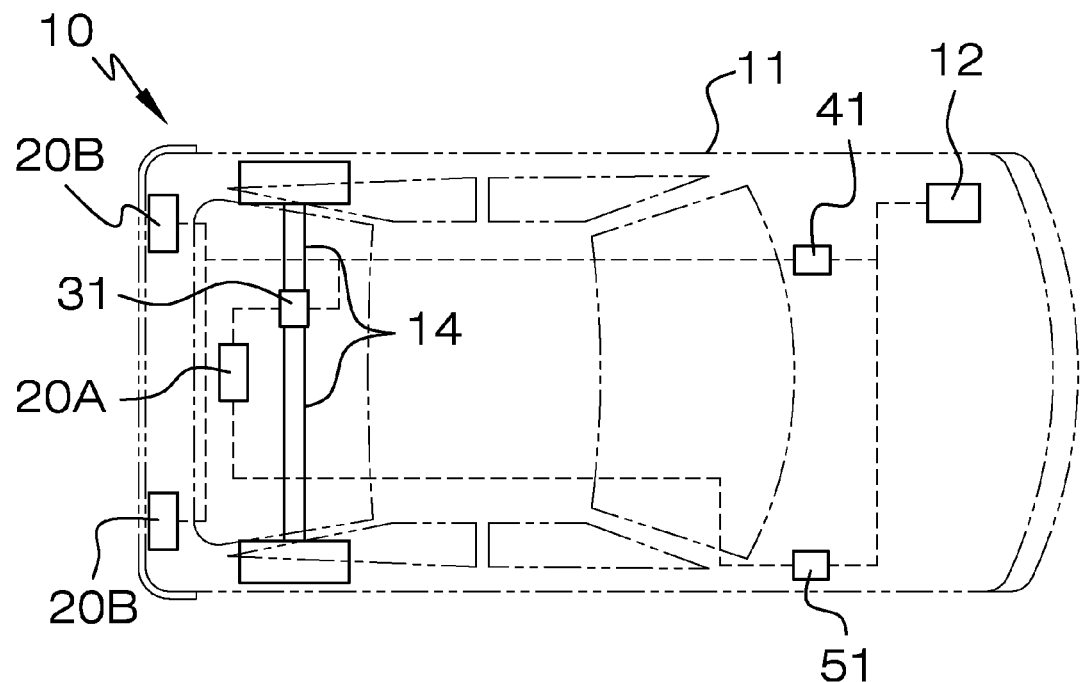
FIG. 3 is a top plan view of the vehicle brake lighting system shown in FIG. 1.

Referring initially to FIGS. 1 and 3, the system 10 includes a plurality of light-emitting sources 20 electrically coupled to an existing power supply source 12 of the leading vehicle 11. One of the light-emitting sources 20A is located at a rear window 13 of the leading vehicle 11. Of course, such a one light-emitting source 20A may be alternately located, as is obvious to a person of ordinary skill in the art. Remaining ones 20B of the light-emitting sources 20 are independently and simultaneously operable with the one light-emitting source 20A.

Figure 2:
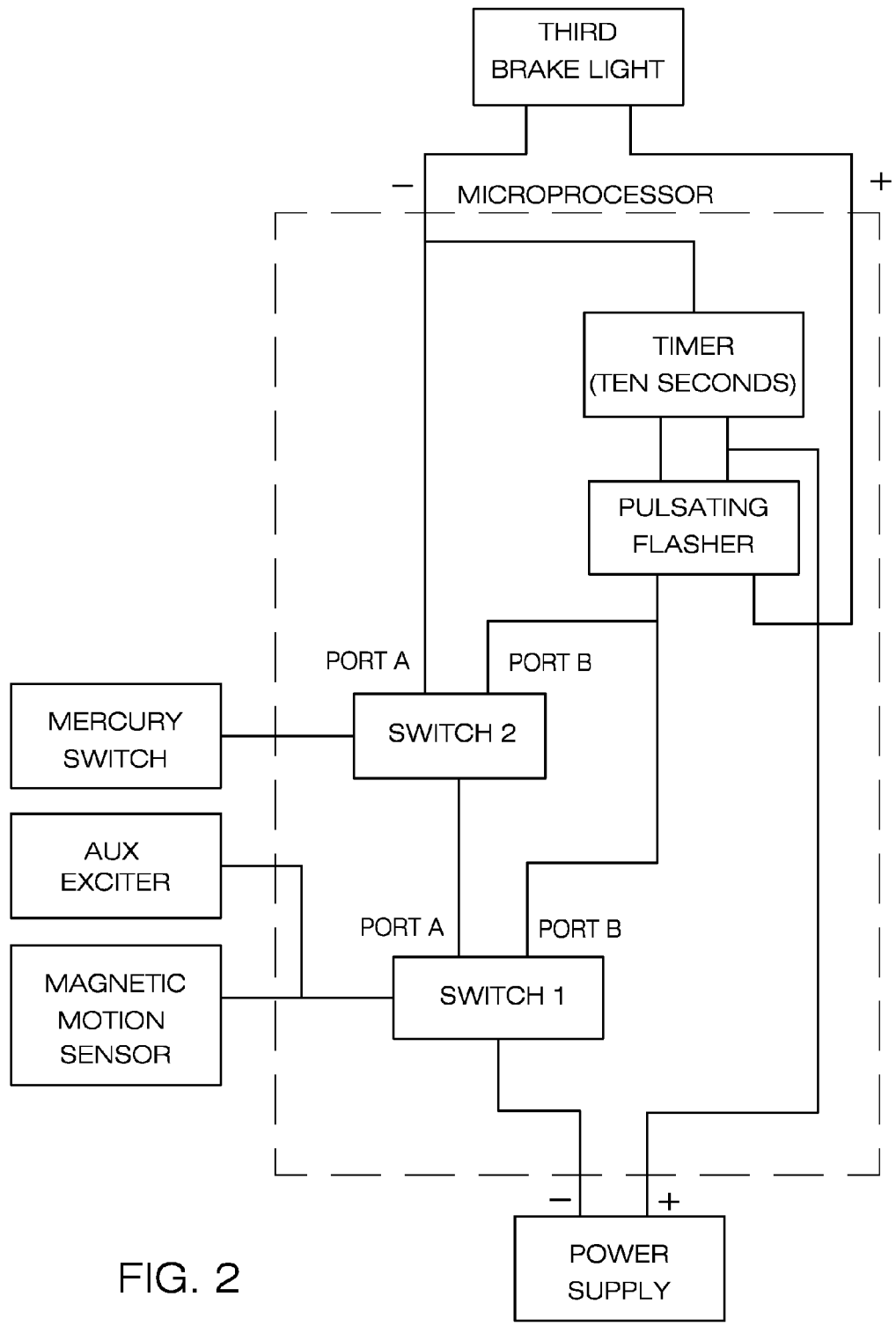
FIG. 2 is a schematic block diagram of the vehicle brake lighting system, in accordance with the present invention.

Referring to FIGS. 2 and 3, a mechanism 30 is included for determining whether the leading vehicle 11 is parked. Such a park determining mechanism 30 includes a magnetic motion sensor 31 mounted to a drive axle 14 of the leading vehicle 11. Of course, the motion sensor may be mounted on a front or rear-wheel drive axle depending on the vehicle's drive system, as is obvious to a person of ordinary skill in the art. The motion sensor 31 effectively generates and transmits a parking input signal 32 to the flashing mechanism 50 (described herein below) when the leading vehicle 11 is toggled to a parked position.

Referring to FIGS. 2, 3, 5*a* and 5*b*, a mechanism 40 is included for conveniently and effectively determining whether a brake pedal 15 of the leading vehicle 11 has been engaged beyond a predetermined threshold pressure level while the leading vehicle 11 is not parked. Such a brake pedal pressure level determining mechanism 40 includes a mercury switch 41 directly coupled, with no intervening elements, to the brake pedal 15 of the leading vehicle 11. The mercury switch 41 is essential for monitoring the brake pedal 15 pressure level during non-parked operating modes. Such a mercury switch 41 includes a mercury filled tube 42 including electrodes 43 at opposed ends 44 thereof.

Figure 5A:
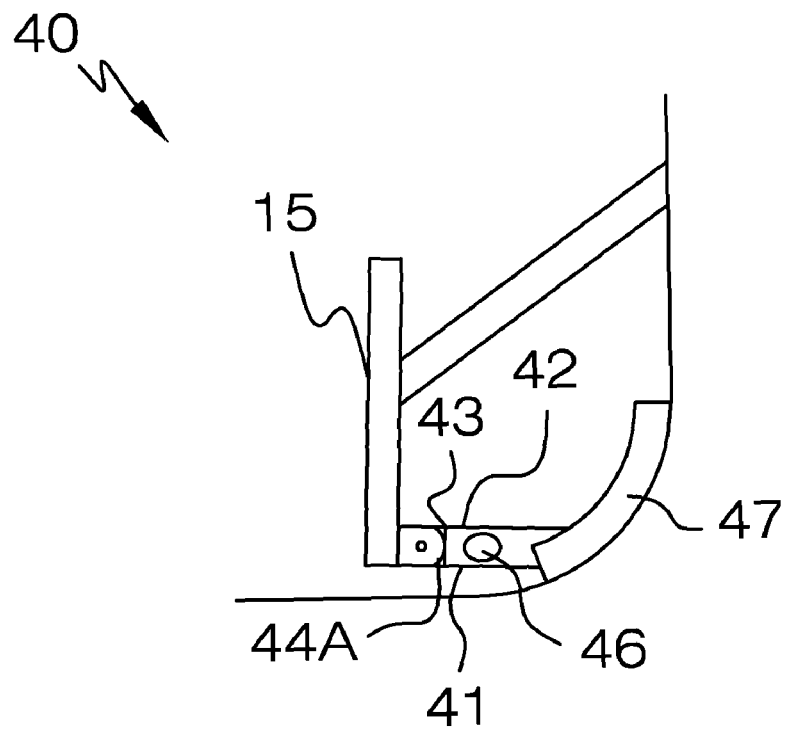
FIG. 5*a* is a side-elevational view of the brake pedal pressure level determining mechanism shown in FIG. 2, wherein the first mercury switch at a deactivated position.
Figure 5B:
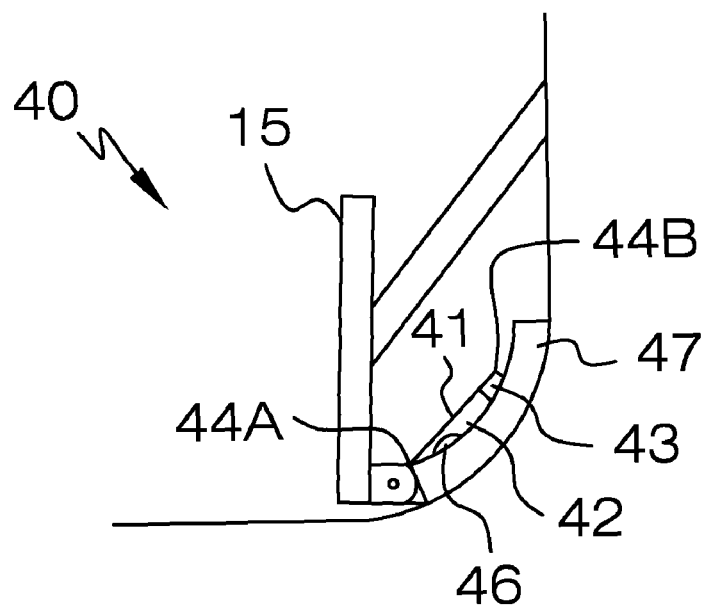
FIG. 5*b* is a side elevational view of the brake pedal pressure level determining mechanism shown in FIG. 5*a*, wherein the first mercury switch at an activated position.

One end portion 44A is pivotally attached to the brake pedal 15 and the other end portion 44B is slidably engaged with a track 47 disposed to a rear of the brake pedal 15. The mercury 46 flows between the opposed ends 44 of the tube 42 when the brake pedal 15 is tilted between engaged and non-engaged positions wherein a braking input signal 45 is conveniently and effectively generated as the mercury slides to one 44A of the opposed end portions 44 of the tube 42, as is best shown in FIGS. 5*a* and 5*b*.

Referring to FIG. 2, a mechanism 50 is included for selectively flashing the one light-emitting source 20A when the vehicle 11 is not parked. This is a critical feature for allowing the operator of a trailing vehicle (not shown) to better judge the intensity with which the leading vehicle 11 is decelerating. This, in turn, can lead to an improvement in the response time of a trailing vehicle operator, which is essential and advantageous for effectively preventing a number of rear-end collisions.

Such a flashing mechanism 50 is electrically mated to the park determining mechanism 30, which is vital and advantageous for indefinitely activating the one light-emitting source 20A when the leading vehicle 11 is parked and the brake pedal 15 is engaged. The flashing mechanism 50 is electrically coupled to the brake pedal pressure level determining mechanism 40, which is important for selectively activating the one light-emitting source 20A for a predetermined time interval when the leading vehicle 11 is not parked and when the brake pedal 15 has been engaged beyond the predetermined threshold pressure level. Such a flashing mechanism 50 is conveniently automatically reset to a non-operating mode when the brake pedal 15 is disengaged during parked and non-parked operating conditions. This advantageously prevents the one light-emitting source 20A from flashing when not needed.

Figure 4:
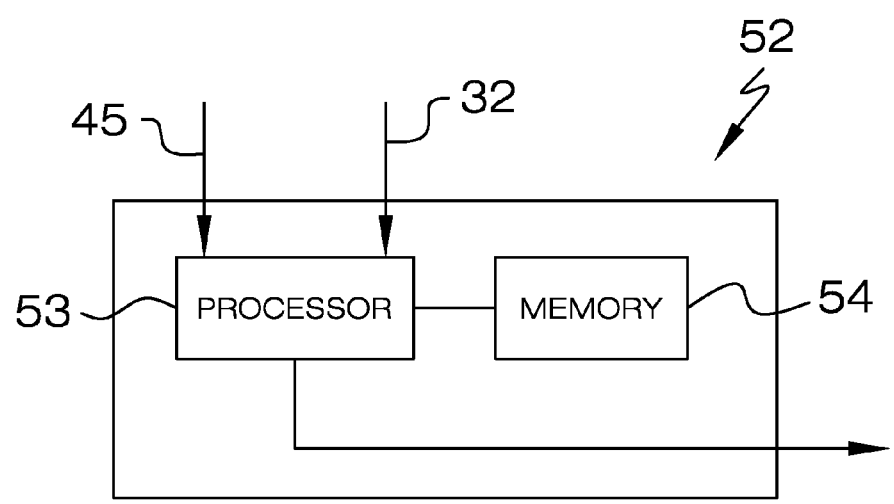
FIG. 4 is a schematic block diagram of the power interrupt circuit shown in FIG. 2.

Referring to FIGS. 1, 2 and 4, the flashing mechanism 50 includes an auxiliary exciter wire 65 electrically coupled to the brake pedal 15, and the pulsating flasher circuit 52. A first switch 67 is electrically coupled to the motion sensor 31 and a power supply source 12 and the auxiliary exciter wire 65 respectively. Such a first switch 67 has first 68 and second 69 isolated conductive ports. Such a second port 69 is electrically coupled directly to the pulsating flasher circuit 52. A second switch 71 has first 72 and second 73 isolated conductive ports wherein the first port 72 is electrically coupled directly to the one light emitting source 20A. Such a second port 73 is electrically coupled to the pulsating flasher circuit 52. Such a first port 68 of the first switch 67 is electrically coupled directly to the second switch 71. A time counting circuit 74 is electrically mated to the pulsating flasher circuit 52 and the one light emitting source 20A and the second switch 71 respectively.

In operation, when the vehicle brakes are applied at a normal braking level, the first switch 67 will receive the signal from the magnetic motion sensor 31 or the auxiliary exciter 65 wire. The first switch 67 will send power to the first port 68 thereof. When the vehicle motion stops, as detected by the motion sensor 31 or exciter 65 wire, the first switch 67 will stop receiving the signal and then close the first port 68 and open the second port 69. When the second switch 71 is in normal mode, it supplies power to its first port 72. When the mercury switch 41 is activated (by pressing the brake), the second switch 71 will then close its first port 72 and transfer power to its second port 73.

Referring to FIG. 2, such a pulsating flasher circuit 52 includes a processor 53 and a memory 54 that includes software instructions that are critical for causing the system 10 to flash the one light-emitting source 20A, such a trailing vehicle operator can advantageously be alerted to braking operations of the leading vehicle 11. The software instructions performs the steps of sequentially interrupting the power supply for an indefinite time interval after the parking input signal 32 has been received from the motion sensor 31 and sequentially interrupting the power supply for a predetermined time interval after the parking input signal 32 has been received from the motion sensor 31 and the braking input signal 45 has been received from the brake pedal pressure level determining mechanism 40.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A vehicle brake lighting system for informing a trailing vehicle of a sudden braking action initiated by a leading vehicle, said vehicle brake lighting system comprising:

a plurality of light-emitting sources electrically coupled to an existing power supply source of the leading vehicle;

means for determining whether the leading vehicle is parked;

means for determining whether a brake pedal of the leading vehicle has been engaged beyond a predetermined threshold pressure level while the leading vehicle is not parked; and means for selectively flashing one said light-emitting sources when the vehicle is not parked, said flashing means being electrically mated to said park determining means for indefinitely activating said one light-emitting source when the leading vehicle is parked and the brake pedal is engaged, said flashing means being electrically coupled to said brake pedal pressure level determining means for selectively activating said one light-emitting source for a predetermined time interval when the leading vehicle is not parked and when the brake pedal has been engaged beyond the predetermined threshold pressure level, wherein said flashing means is automatically reset to a non-operating mode when the brake pedal is disengaged during parked and non-parked operating conditions;

wherein said park determining means comprises a magnetic motion sensor mounted to a drive axle of the leading vehicle, said motion sensor generating and transmitting a parking input signal to said flashing means when the leading vehicle is toggled to a parked position;

wherein said brake pedal pressure level determining means comprises a mercury switch directly coupled to the brake pedal of the leading vehicle, said mercury switch monitoring the brake pedal pressure level during non-parked operating modes, said mercury switch comprising a mercury filled tube including electrodes at opposed ends thereof, said mercury flowing between said opposed ends of said tube when the brake pedal is tilted between engaged and non-engaged position wherein a braking input signal is generated as said mercury slides to said opposed end portions of said tube;

wherein said flashing means comprises an auxiliary exciter wire electrically coupled to the brake pedal;

a pulsating flasher circuit;

a first switch electrically coupled to said motion sensor and a power supply source and said auxiliary exciter wire respectively, said first switch having first and second isolated conductive ports, said second port being electrically coupled directly to said pulsating flasher circuit;

a second switch having first and second isolated conductive ports, said first port being electrically coupled directly to said one light emitting source, said second port being electrically coupled to said pulsating flasher circuit, wherein said first port of said first switch is electrically coupled directly to said second switch; and a time counting circuit electrically mated to said pulsating flasher circuit and said one light emitting source and said second switch respectively;

wherein said pulsating flasher circuit comprises a processor; and a memory including software instructions for causing said system to flash said one light-emitting source, said software instructions performing the steps of:

sequentially interrupting the power supply for an indefinite time interval after said parking input signal has been received from said motion sensor, and sequentially interrupting the power supply for a predetermined time interval after said parking input signal has been received from said motion sensor and said braking input signal has been received from said brake pedal pressure level determining means.

2. A vehicle brake lighting system for informing a trailing vehicle of a sudden braking action initiated by a leading vehicle, said vehicle brake lighting system comprising:
   a plurality of light-emitting sources electrically coupled to an existing power supply source of the leading vehicle, said one light-emitting source being locating at a rear window of the leading vehicle;
   means for determining whether the leading vehicle is parked;
   means for determining whether a brake pedal of the leading vehicle has been engaged beyond a predetermined threshold pressure level while the leading vehicle is not parked; and
   means for selectively flashing one said light-emitting sources when the vehicle is not parked, said flashing means being electrically mated to said park determining means for indefinitely activating said one light-emitting source when the leading vehicle is parked and the brake pedal is engaged, said flashing means being electrically coupled to said brake pedal pressure level determining means for selectively activating said one light-emitting source for a predetermined time interval when the leading vehicle is not parked and when the brake pedal has been engaged beyond the predetermined threshold pressure level, wherein said flashing means is automatically reset to a non-operating mode when the brake pedal is disengaged during parked and non-parked operating conditions;
   said park determining means comprises:
      a magnetic motion sensor mounted to a drive axle of the leading vehicle, said motion sensor generating and transmitting a parking input signal to said flashing means when the leading vehicle is toggled to a parked position;
   said flashing means comprises:
      an auxiliary exciter wire electrically coupled to the brake pedal;
      a pulsating flasher circuit;
      a first switch electrically coupled to said motion sensor and a power supply source and said auxiliary exciter wire respectively,
   said first switch having first and second isolated conductive ports, said second port being electrically coupled directly to said pulsating flasher circuit;
   a second switch having first and second isolated conductive ports, said first port being electrically coupled directly to said one light emitting source, said second port being electrically coupled to said pulsating flasher circuit, wherein said first port of said first switch is electrically coupled directly to said second switch; and
   a time counting circuit electrically mated to said pulsating flasher circuit and said one light emitting source and said second switch respectively.

3. The system of claim 2, wherein said brake pedal pressure level determining means comprises:
   a mercury switch directly coupled to the brake pedal of the leading vehicle, said mercury switch monitoring the brake pedal pressure level during non-parked operating modes, said mercury switch comprising a mercury filled tube including electrodes at opposed ends thereof, said mercury flowing between said opposed ends of said tube when the brake pedal is tilted between engaged and non-engaged position wherein a braking input signal is generated as said mercury slides to said opposed end portions of said tube.

4. The system of claim 2, wherein said pulsating flasher circuit comprises:
   a processor; and
   a memory including software instructions for causing said system to flash said one light-emitting source, said software instructions performing the steps of:
      sequentially interrupting the power supply for an indefinite time interval after said parking input signal has been received from said motion sensor, and
      sequentially interrupting the power supply for a predetermined time interval after said parking input signal has been received from said motion sensor and said braking input signal has been received from said brake pedal pressure level determining means.

5. A vehicle brake lighting system for informing a trailing vehicle of a sudden braking action initiated by a leading vehicle, said vehicle brake lighting system comprising:
   a plurality of light-emitting sources electrically coupled to an existing power supply source of the leading vehicle, said one light-emitting source being locating at a rear window of the leading vehicle, remaining ones of said light-emitting sources being independently and simultaneously operable with said one light-emitting source;
   means for determining whether the leading vehicle is parked;
   means for determining whether a brake pedal of the leading vehicle has been engaged beyond a predetermined threshold pressure level while the leading vehicle is not parked; and
   means for selectively flashing one said light-emitting sources when the vehicle is not parked, said flashing means being electrically mated to said park determining means for indefinitely activating said one light-emitting source when the leading vehicle is parked and the brake pedal is engaged, said flashing means being electrically coupled to said brake pedal pressure level determining means for selectively activating said one light-emitting source for a predetermined time interval when the leading vehicle is not parked and when the brake pedal has been engaged beyond the predetermined threshold pressure level, wherein said flashing means is automatically reset to a non-operating mode when the brake pedal is disengaged during parked and non-parked operating conditions;
   wherein said park determining means comprises:
      a magnetic motion sensor mounted to a drive axle of the leading vehicle,
      said motion sensor generating and transmitting a parking input signal to said flashing means when the leading vehicle is toggled to a parked position;
   wherein said flashing means comprises:
      an auxiliary exciter wire electrically coupled to the brake pedal;
      a pulsating flasher circuit; a first switch electrically coupled to said motion sensor and a power supply source and said auxiliary exciter wire respectively, said first switch having first and second isolated conductive ports, said second port being electrically coupled directly to said pulsating flasher circuit;
   a second switch having first and second isolated conductive ports, said first port being electrically coupled directly to said one light emitting source,
   said second port being electrically coupled to said pulsating flasher circuit, wherein said first port of said first switch is electrically coupled directly to said second switch; and a time counting circuit electrically mated to said pulsating flasher circuit and said one light emitting source and said second switch respectively.

6. The system of claim 5, wherein said brake pedal pressure level determining means comprises:

a mercury switch directly coupled to the brake pedal of the leading vehicle, said mercury switch monitoring the brake pedal pressure level during non-parked operating modes, said mercury switch comprising a mercury filled tube including electrodes at opposed ends thereof, said mercury flowing between said opposed ends of said tube when the brake pedal is tilted between engaged and non-engaged position wherein a braking input signal is generated as said mercury slides to said opposed end portions of said tube.

7. The system of claim 5, wherein said pulsating flasher circuit comprises:

a processor; and a memory including software instructions for causing said system to flash said one light-emitting source, said software instructions performing the steps of:

sequentially interrupting the power supply for an indefinite time interval after said vehicle is in stationary input signal has been received from said motion sensor, and sequentially interrupting the power supply for a predetermined time interval after said vehicle is in stationary input signal has been received from said motion sensor and said braking input signal has been received from said brake pedal pressure level determining means.

* * * * *